(12) United States Patent
Li et al.

(10) Patent No.: US 7,265,169 B2
(45) Date of Patent: Sep. 4, 2007

(54) ADHESIVE COMPOSITIONS AND METHODS OF USING AND MAKING THE SAME

(75) Inventors: Kaichang Li, Corvallis, OR (US); Xinglian Geng, Quebec (CA)

(73) Assignee: State of Oregon Acting by and trhough the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 10/802,500

(22) Filed: Mar. 16, 2004

(65) Prior Publication Data

US 2004/0220368 A1 Nov. 4, 2004

Related U.S. Application Data

(60) Provisional application No. 60/456,568, filed on Mar. 20, 2003.

(51) Int. Cl.
*C08L 97/00* (2006.01)
*C08J 197/00* (2006.01)
*C08K 5/13* (2006.01)
*C08K 3/00* (2006.01)

(52) U.S. Cl. .................. 524/72; 524/73; 524/404; 523/129

(58) Field of Classification Search .......... 524/72, 524/73, 404; 523/129
See application file for complete search history.

(56) References Cited

U.S. PATENT DOCUMENTS

| | | | |
|---|---|---|---|
| 2,882,250 A | | 4/1959 | Baker |
| 2,926,116 A | | 2/1960 | Keim |
| 2,926,154 A | | 2/1960 | Keim |
| 3,274,042 A | | 9/1966 | Gilboe et al. |
| 3,285,801 A | * | 11/1966 | Sarjeant ............ 428/221 |
| 3,494,775 A | | 2/1970 | Coscia et al. |
| 3,634,399 A | | 1/1972 | Coscia et al. |
| 3,697,497 A | * | 10/1972 | Falkehag ............ 530/505 |
| 4,382,136 A | * | 5/1983 | Blount ............ 527/305 |
| 4,675,351 A | | 6/1987 | Brown |
| 5,021,531 A | | 6/1991 | Schroeder |
| 5,026,808 A | | 6/1991 | Schroeder |
| 5,374,670 A | | 12/1994 | Ayorinde et al. |
| 6,030,562 A | * | 2/2000 | Lehtinen et al. ......... 264/83 |
| 6,124,032 A | * | 9/2000 | Bloch et al. ......... 428/346 |
| 6,277,481 B1 | * | 8/2001 | Sugino et al. ......... 428/317.1 |
| 6,306,997 B1 | | 10/2001 | Kuo et al. |
| 6,339,116 B1 | | 1/2002 | Afzali-Ardakani et al. |
| 6,368,529 B1 | * | 4/2002 | Lloyd et al. ......... 264/109 |
| 6,716,421 B2 | * | 4/2004 | Brode et al. ......... 424/84 |
| 2002/0005251 A1 | | 1/2002 | Sun et al. |
| 2002/0026025 A1 | | 2/2002 | Kuo et al. |
| 2004/0037906 A1 | | 2/2004 | Li et al. |
| 2004/0089418 A1 | * | 5/2004 | Li ............ 156/296 |

FOREIGN PATENT DOCUMENTS

| | | |
|---|---|---|
| DE | 198 43 493 | 3/2003 |
| EP | 0 199 171 A2 | 7/1986 |
| EP | 0 969 056 A1 | 1/2000 |
| WO | WO 00/08110 | 2/2000 |

OTHER PUBLICATIONS

DuPont Protein Technologies, Soy Protein Forms, http://www.proteintechnologies.com/corp_eng.nsh/pages/Soy-3, 2002.
Georgia-Pacific Chemical Products, Wet and Dry Strength Resins, http://www.gp.com/chemical/products.asp, 2002.
Hercules Incorporated, Material Safety Data Sheet, http://msds.plaza.herc.com/msds/00223300.html.
Hercules Incorporated, Kymene 557H Wet-Strength Resin Product Data Sheet, 1999.
Li et al., *Advances in Biodegradation and Biotransformation of Lignocellulosics*, The 225th ACS National Meeting, New Orleans, LA, Mar. 24, 2003.
Li et al., *Composites from Renewable Resources*, The 225th ACS National Meeting, New Orleans, LA, Mar. 26, 2003.
Li et al., *Investigation of New Formaldehyde-Free Wood Adhesive Systems Consisting of Biopolymers and an Aqueous Curing Agent* (Abstract), Forest Products Society 57th Annual Meeting, Bellevue, WA, Jun. 22-25, 2003.
Liu et al., *Macromol. Rapid Commun.* 23(13):739-742, 2002.
PCT/US2004/012307 International Search Report (mailed Dec. 29, 2004).

* cited by examiner

*Primary Examiner*—Nathan M. Nutter
(74) *Attorney, Agent, or Firm*—Klarquist Sparkman, LLP

(57) ABSTRACT

Adhesive compositions produced from abundant and renewable resources such as lignocellulosic materials, particularly decayed lignocellulosic materials or demethylated lignin. Other components present in particular examples of the adhesive compositions include relatively inexpensive materials, such as borates and/or polyethyleneimine. Also disclosed are lignocellulosic composites that are made from the adhesive compositions.

29 Claims, 6 Drawing Sheets ic composite materials have
ADHESIVE COMPOSITIONS AND METHODS OF USING AND MAKING THE SAME This application claims the benefit of U.S. Provisional Application No. 60/456,568, filed Mar. 20, 2003, the entire disclosure of which is incorporated herein by reference.

ACKNOWLEDGEMENT OF GOVERNMENT SUPPORT

The United States government may have certain rights in the invention pursuant to grant number 2001-35504-10993, awarded by the National Research Initiative Competitive Grants Program of the USDA.

FIELD

The present disclosure concerns adhesive compositions.

BACKGROUND

Due to changes in the size and quality of standing timber available for harvest, and economic pressure on the wood products industry, lignocellulosic composite materials have replaced and supplemented traditional solid sawn lumber for use in many structural applications. These lignocellulosic composites are formed from small pieces of cellulosic material that are bonded with an adhesive or binder. In general, the small pieces of cellulosic material are produced by fragmenting solid wood into strands, fibers or chips. A wood adhesive is then added to the fragmented wood material. The resulting mixture is then typically subjected to heat and pressure, which forms a composite material. The adhesive is typically the major non-woody component of the composite.

Currently, most wood composites use a phenol-formaldehyde (PF) or urea-formaldehyde (UF) wood adhesive. These adhesive materials suffer from two major drawbacks. First, both adhesives release volatile organic compounds (VOC) during their manufacture and during their use. Released VOC include chemicals that are thought to be hazardous to human health, such as formaldehyde, which is a suspected carcinogen. Increasing concern about the effect of emissive VOC, particularly formaldehyde, on human health has prompted the development of more benign adhesives. The emission of VOC, including formaldehyde, from wood composites has been studied extensively. See, for example, Baumann et al., "Aldehyde Emission from Particleboard and Medium Density Fiberboard Products," *For. Prod. J.* 50:75-82, 2000; Henderson, J. T., "Volatile Emissions from the Curing of Phenolic Resins," *Tappi J.*, 62:9396, 1979; Lambuth, A. L., "Adhesives from Renewable Resources: Historical Perspective and Wood Industry Needs," *Adhesives from Renewable Resources*; Hemingway, R. W. Conner, A. H. Branham, S. J., Eds.; American Chemical Society: Washington, D.C., pp 5, 6, 1989.

Second, PF and UF resins are produced from petroleum products. Petroleum reserves are naturally limited. Thus the wood composites industry would benefit greatly from the development of formaldehyde-free adhesives produced from renewable resources.

SUMMARY

Disclosed herein are adhesive compositions and methods for making lignocellulosic composites from renewable materials.

A first variant of an adhesive composition described herein includes at least one lignin component, at least one amine compound, and at least one boron compound. In a second variant of an adhesive composition, the composition is produced by mixing decayed lignocellulosic material, at least one amine compound, and at least one further ingredient such as a boron compound or a reducing agent. A third variant of the adhesive composition includes solubilized decayed lignocellulosic material and a polyamine.

Also disclosed herein are lignocellulosic composites comprising the adhesive compositions and methods for making the composites.

BRIEF DESCRIPTION OF THE DRAWINGS

Certain embodiments will be described in more detail with reference to the following drawings.

DETAILED DESCRIPTION

Figure 1:
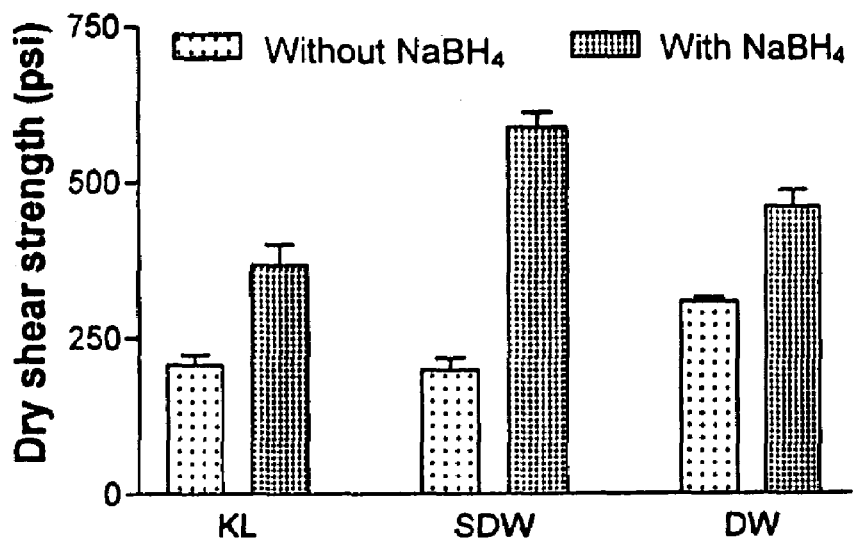
FIG. 1 is a bar graph illustrating the dry shear strength of wood composites made using adhesives prepared with and without sodium borohydride.

For ease of understanding, the following terms used herein are described below in more detail:

"Lignin" generally refers to a group of phenolic polymers that confer strength and rigidity to plant material. Lignins are very complex polymers with many random couplings, and thus tend to be referred to in more generic terms. Lignins may include, for instance, analytical lignin preparations such as Brauns lignin, cellulolytic enzyme lignin, dioxane acidolysis lignin, milled wood lignin, Klason lignin, and periodate lignin, and industrial lignin preparations such as kraft lignin, lignosulfonates, and demethylated lignin.

"Lignin component" denotes any lignin-containing material or composition. The lignin component can be derived from renewable resources, particularly lignocellulosic materials, and can include one or more materials such as decayed wood, solubilized decayed wood, analytical lignin preparations, industrial lignin preparations, and the like. The lignin component can be a material or compositions that has been modified or treated to concentrate, separate and/or purify the lignin portion.

"Lignocellulosic materials" include all plant materials. Illustrative materials include wood materials as described above, grain materials such as the straw and/or fiber of rice, corn, wheat, oats or barley, grass materials such as hemp or flax, and composted plant material. The lignocellulosic material can be byproducts and waste generated from agricultural or food processing.

"Decayed lignocellulosic material" and "decayed wood" generally refer to lignocellulosic materials or wood that is in a state of decay which may be incipient, intermediate or advanced decay. The decay may, or may not, be readily visible to the unaided eye, but there should be sufficient decay so that the cellulosic structure has at least partially degraded so as to increase the amount of lignin and/or carbohydrates freely available for bonding. The decay may be caused by any agent such as fungi, insects, or a combination thereof. Decayed wood may occur in living trees, fallen trees, or processed wood products. One example of decayed wood is brown-rot-fungus-degraded wood. An example of decayed lignocellulosic material is the residual plant material remaining from the growing and harvesting of mushrooms. In particular, mushrooms are grown commercially in lignocellulosic materials such as a decomposed straw mixture. Once the mushrooms are harvested, the residual growth material has a high content of lignin that can be used in the presently described adhesive.

The above term descriptions are provided solely to aid the reader, and should not be construed to have a scope less than that understood by a person of ordinary skill in the art or as limiting the scope of the appended claims.

An adhesive composition can be made by mixing a lignin component with at least one polyamine. The lignin component or lignin/polyamine mixture can be treated with an adhesion promoter to improve particular adhesion characteristics.

In particular embodiments the lignin component comprises naturally or artificially decayed lignocellulosic materials. Decayed lignocellulosic materials include both lignin and carbohydrates. Decayed lignocellulosic material can be prepared for use in adhesive compositions in any manner. In one variant the decayed lignocellulosic material, such as decayed wood, is ground to a fine mesh or flour and then mixed with a polyamine to produce an adhesive composition. In specific examples, naturally decayed Douglas fir wood, collected from a forest in Oregon, may be ground to a size of about 30 mesh. However, decayed wood ground to different mesh sizes, from other species and from different locations can be used in the present adhesive compositions. Mixtures of decayed wood from different species may be used.

The decayed lignocellulosic material may optionally be solubilized or extracted to give solubilized decayed lignocellulosic material. Solubilized decayed lignocellulosic material can be used in adhesive compositions with or without further treatment. Any suitable solvent may be used for the solubilization or extraction such as water or aqueous base solutions. According to one illustrative method, the decayed lignocellulosic material may be mixed with an appropriate amount of an aqueous base or alkaline solution. The amount of solvent used for solubilizing the decayed lignocellulosic material should be sufficient to dissolve at least 50 weight percent of the decayed lignocellulosic material. The resulting mixture then is filtered and the filtrate comprises solubilized decayed lignocellulosic material.

Various bases may be used such as sodium hydroxide, potassium hydroxide, and sodium carbonate to formulate the alkaline solution. In general, the amount of alkaline solution used for solubilizing the decayed lignocellulosic material should produce a solubilized decayed lignocellulosic composition exhibiting a pH ranging from about 7 to about 13. Alternatively, a mixture of decayed lignocellulosic material and an alkaline solution from which insoluble solids have not been separated may be used as an ingredient in the adhesive. In this variant, the mixture may contain solubilized decayed lignocellulosic material and lignocellulosic solids that have not solubilized.

As mentioned above, the lignin component may also comprise an industrial lignin preparation such as kraft lignin. For example, an adhesive composition can be produced using kraft lignin in place of or in addition to decayed wood, including solubilized decayed wood. Currently kraft lignin has limited commercial utility, however tons of waste kraft lignin are produced each year as a byproduct of commercial paper production. In particular, kraft lignin typically is produced from woody material in reaction with NaOH and $Na_2S$.

A further example of an industrial lignin is demethylated lignin. Demethylated lignin is lignin that has undergone a substantial degree of demethylation. For example, the methyl content of demethylated lignin may range from about 1 to about 60 wt. % of the methyl content of the original or precursor lignin material. One source of demethylated lignin is as an industrial byproduct of manufacturing dimethyl sulfide from the removal of the methyl group in kraft lignin.

The lignin component sources described above are believed to be the most economical options; however other sources for the lignin component also can be used to prepare adhesive compositions. Moreover, mixtures of various types of lignin components may be employed.

According to certain examples, the decayed wood used in the present compositions may contain about 60 to about 95% lignin by weight, whereas the solubilized decayed wood used may contain about 30 to about 70% lignin by weight. Accurately measuring lignin concentration is difficult, and different methods for measuring lignin content of wood can give different results. One illustrative method is referred to as a "Klason" lignin determination. Klason lignin determination is measured according to TAPPI Test Methods T 222 om-88.

The lignin component can optionally be treated or mixed with at least one adhesion promoter. The adhesion promoter may improve the adhesive strength and water resistance of the present adhesive compositions.

A first class of adhesion promoters comprises boron compounds, particularly borate derivatives. Without limitation to theory, it is currently believed that boric acid and borate derivatives can bond to phenolic moieties, particularly catechol moieties, present in the lignin of decayed lignocellulosic material, to form borate ester derivatives. Boric acid and borate derivatives may also bond to hydroxyl groups of carbohydrates, especially mannans and galactans, to form borate ester derivatives. Such borate ester derivatives can interact covalently and noncovalently with functional groups present in lignocellulosic materials, particularly alcoholic functional groups, thereby promoting adhesion.

In particular examples the adhesion promoter is a boron compound, such as boric acid, a borate ester, boron salt, or sodium borohydride. The boron compound may be any compound or material that includes at least one boron atom or species. As is understood by those of ordinary skill in the art, boric acid, boron salts and borate esters can be produced from numerous other boron compounds, including without limitation, metaborates, acyl borates, anhydrous borates, borax, boron hydrides, and the like. Specific examples of boron salts or borate esters include sodium borate, anhydrous sodium borate, sodium tetraborate, sodium boroformate and sodium borohydride. Similarly, a person of ordinary skill in the art will recognize that boron compounds can be provided as various salts and in various hydration states, including without limitation, $KB_5 \cdot H_2O$, $Na_2B_4O_7 \cdot 10H_2O$, $Na_2B_4O_7 \cdot 5H_2O$, $Mg_3B_7O_{13}Cl$, $K_3B_3O_6$, $CaB_2O_4$, and the like.

A second class of adhesion promoters comprises reducing agents. Without limitation to any theory, it is thought that a reducing agent acts as an adhesion promoter by reducing at least some quinone moieties produced by lignin oxidation during lignocellulosic decay to the corresponding hydroquinone derivatives. The hydroquinone derivatives are able to hydrogen bond to lignocellulosic materials, thereby promoting adhesion. Particularly useful adhesion promoters include metal hydride reagents, such as boron and aluminum hydrides.

Specific examples use sodium borohydride as an adhesion promoter. Because sodium borohydride is a reducing agent that forms a borate derivative when used in the present composition, it is a member of both the first and second class of adhesion promoters described above. Adhesive compositions comprising boric acid may exhibit comparable adhesive strength as compositions comprising sodium borohydride. Because boric acid is considerably less expensive than sodium borohydride, there may be a cost advantage to using boric acid in the present adhesive compositions.

The adhesion promoter typically comprises from about 0.01% to about 15% by weight of the adhesive composition relative to the lignin component used. More typically the adhesion promoter comprises from about 0.05% to about 10%, and more particularly from about 0.1% to about 4% adhesion promoter relative to the lignin component.

The amine compound may be any compound or material that includes at least one amine functional group. Illustrative amine compounds include alkyl amines (e.g., 1,3-diaminopropane, 1,6-hexanediamine, ethylene diamine, diethylenetriamine, triethylenetetramine), unsaturated hydrocarbon amines (e.g., allylamine), hydroxyl amines (e.g., ethanolamine, hydroxylamine), amidines (e.g., melamine), imines, amino acids (e.g., 4-aminobutyric acid, 6-aminocaprioc acid), polyamines (e.g., polyethyleneimine, polyvinylamine, polyallylamine), polyamidoamines (e.g., condensation products of adipic acid and diethylenetriamine), and mixtures thereof. In typical adhesive compositions, the weight ratio of the lignin component to the amine compound may be from about 1:1 to about 7:1.

The adhesive composition may also include additives and fillers found in lignocellulosic adhesives such as bactericides, insecticides, silica, wheat flour, tree bark flour, nut shell flour and the like.

The ingredients of the adhesive composition may be mixed together in any order and at standard temperature and pressure (i.e., about 25° C. and about 1 atmosphere). Typically, the ingredients are water soluble or water dispersible. The solids content of the resulting final adhesive mixture may be from about 5 to about 50, more particularly from about 10 to about 25, wt. %. Each (or only one) part of the adhesive system could be provided to the end user in the form of a concentrate that is diluted by the end user to the appropriate mix ratios and solid contents.

According to one approach, the adhesive composition can be utilized as a two-part system in which the lignin component (either untreated or treated with an adhesion promoter) comprises one part and the amine compound comprises the second part. The two parts are mixed together a short time prior to use. The composition may have an open time of up to about 9 or 10 hours. As used herein, "open time" denotes the time from mixing of the two parts to the time at which the mixed composition cures to a point that it is no longer workable.

The adhesive compositions are heat-curable. In other words, heating the adhesive mixture forms covalent bonds between the individual molecules of the adhesive composition and covalent and/or hydrogen bonds between molecules of the adhesive mixture and the lignocellulosic particles. Such curing typically occurs during the hot pressing step of the composite formation. Thus, the cure temperature of the adhesive composition is tailored so that it coincides with the heating temperatures used in composite formation. Such cure temperatures may range, for example, from about 100 to about 200° C., more particularly from about 120 to about 170° C.

Lignocellulosic composites produced using the present formaldehyde-free adhesives include particleboard, plywood, oriented strand board (OSB), waferboard, fiberboard (including medium-density and high-density fiberboard), parallel strand lumber (PSL), laminated strand lumber (LSL), laminated veneer lumber (LVL), and similar products. Examples of suitable lignocellulosic raw materials for producing lignocellulosic composites include wood, flax, hemp, and straw, including wheat, rice and barley straw. The lignocellulosic raw material can be processed into any suitable substrate form and size, including various particles or fragments such as chips, flakes, fibers, strands, wafers, trim, shavings, sawdust, and combinations thereof. It should be recognized that references herein to "lignocellulosic material" for making the lignocellulosic composites do not refer to the lignocellulosic material that can be used as an ingredient for the adhesive itself.

Typically the lignocellulosic materials are mixed with the adhesive as a binder and formed into a desired configuration to give a pre-bonded assembly. The pre-bonded assembly is then typically subjected to elevated pressure and temperature to give a lignocellulosic composite product. Typically, the adhesive composition is heated until sufficient water is removed from the composition. For example, the adhesive composition may be heated to at least about 100° C., and typically the composition may be heated to between about 120 to about 225° C.

The amount of adhesive mixed with the lignocellulosic material may vary depending, for example, upon the desired composite type, lignocellulosic material type and amount, and specific adhesive composition. In general, about 1 to about 10, more particularly about 2 to about 5, weight percent adhesive may be mixed with the lignocellulosic material, based on the total combined weight of adhesive and lignocellulosic material. The mixed adhesive composition may be added to the lignocellulosic particles by spraying or similar techniques while the lignocellulosic particles are tumbled or agitated in a blender or similar mixer. For example, a stream of the lignocellulosic particles may be intermixed with a stream of the mixed adhesive composition and then be subjected to mechanical agitation.

The adhesive compositions also may be used to produce plywood or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

The presently disclosed adhesives provide a strong bond between the lignocellulosic substrates or particles. The adhesives also provide structural composites with surprisingly high mechanical wet strength. The novel adhesive compositions disclosed herein provide adhesive properties comparable or superior to commercial phenol-formaldehyde resins, but do not require using formaldehyde. In particular, the adhesive compositions may be substantially free of formaldehyde (including any compounds that may degenerate to form formaldehyde). For example, the adhesive compositions do not contain any formaldehyde (and formaldehyde-generating compounds) that is detectable by conventional methods or, alternatively, the amount of formaldehyde (and formaldehyde-generating compounds) is negligible from an environmental and workplace regulatory standpoint.

The specific examples described below are for illustrative purposes and should not be considered as limiting the scope of the appended claims.

EXAMPLE 1

This example describes the preparation of solubilized decayed wood. Ground, decayed Douglas fir wood (40 grams) was mixed with 0.6 liter of a 1% aqueous solution of sodium hydroxide (NaOH), and stored in a 70° C. water bath for 2 hours with occasional stirring. The mixture was filtered using a paper filter and the residue was washed with 0.4 liter of hot 1% NaOH solution. The filtrate was collected and concentrated in vacuo to 16.5% by weight percentage of solubilized decayed wood to solvent. Approximately 55% by weight of the decayed wood was dissolved. The solubilized decayed wood produced by this procedure was used as a raw material for preparing adhesive compositions.

EXAMPLE 2

This example describes preparing adhesive compositions from various lignin components. Kraft lignin (KL), decayed wood (DW), or solubilized decayed wood (SDW) was combined with polyethyleneimine (PEI, Mw 10,000, commercially available from Polysciences, Inc., Warrington, Pa.) in a weight ratio of 5:1 decayed wood to PEI (to generate the data shown in FIGS. 1-3). The mixture was stirred at room temperature for 1 hour to form the adhesive composition, which was then used directly to glue composites as described below in more detail.

EXAMPLE 3

Figure 4:
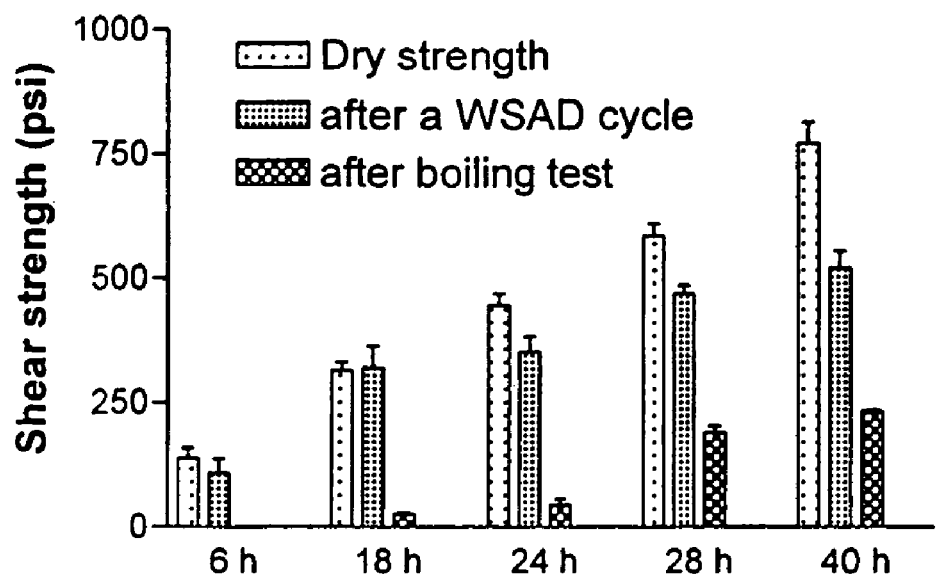
FIG. 4 is a bar graph illustrating the effect of sodium borohydride-solubilized decayed wood mixing time on shear strength.
Figure 5:
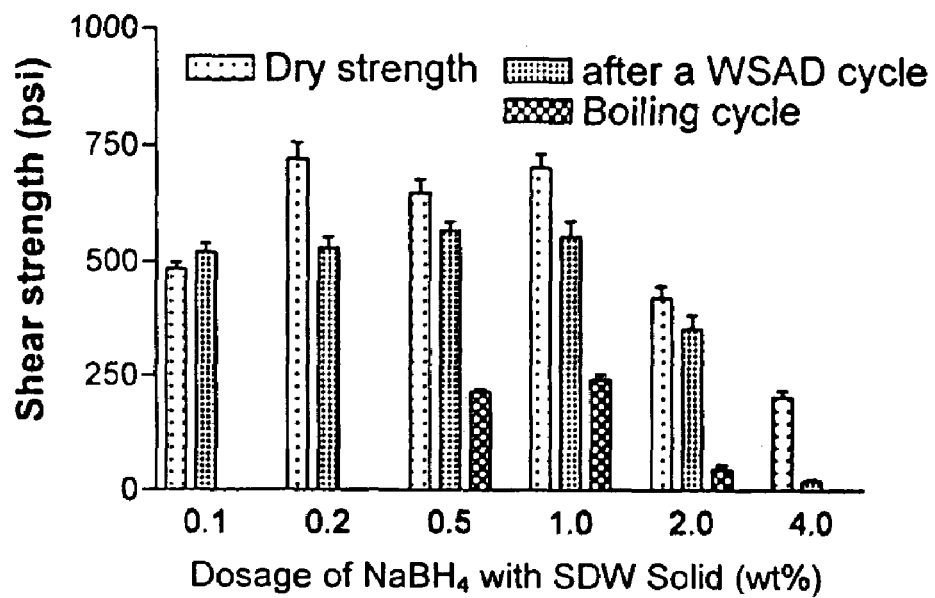
FIG. 5 is a bar graph illustrating the shear strength of wood composites prepared with different amounts of sodium borohydride.

This example describes preparing adhesive compositions from various lignin components treated with $NaBH_4$. $NaBH_4$ was added as a solid to KL, DW or SDW. The amount of added $NaBH_4$ based on the dry weight of the respective lignin component was 1% to generate the data shown in FIGS. 1-3 and 6, 2% to generate the data shown in FIG. 4, and varied to generate the data shown in FIG. 5. The resulting mixture was stirred at room temperature for 24 hours (or varied times for FIG. 4). PEI then was added as described above in Example 2.

EXAMPLE 4

Figure 7:
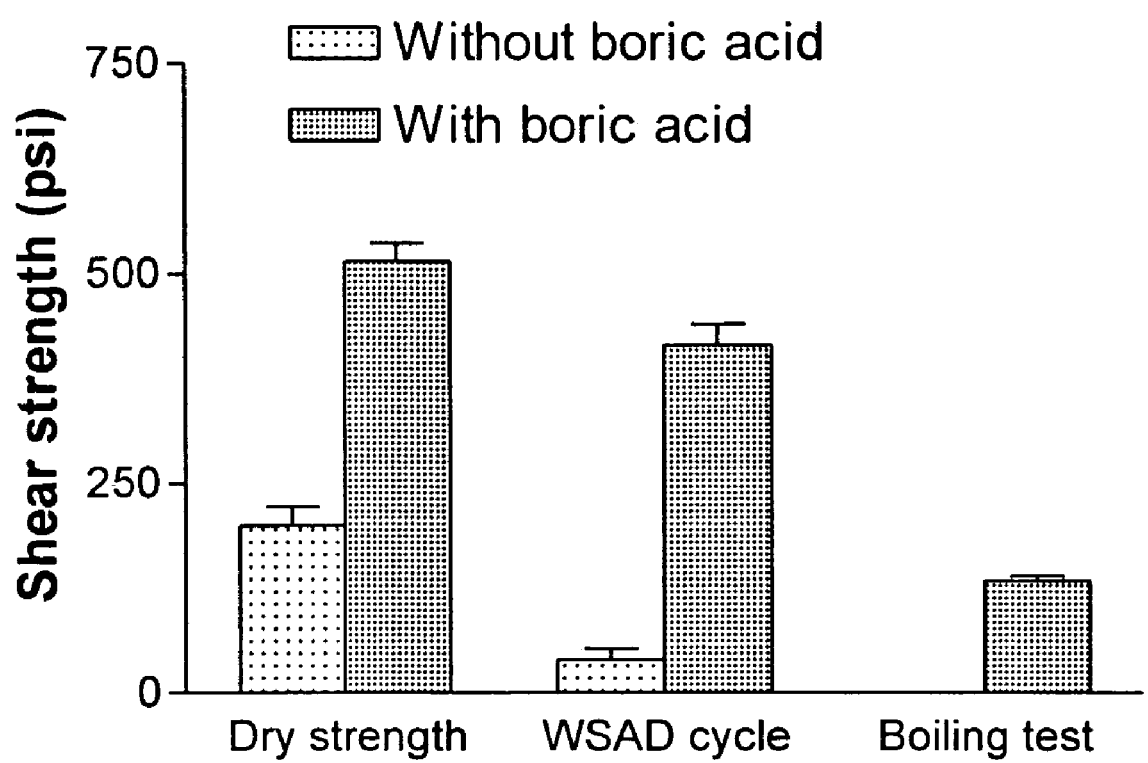
FIG. 7 is a bar graph illustrating the shear strength of wood composites prepared using adhesive compositions that include boric acid.

This example describes preparing adhesive compositions from solubilized decayed wood (SDW) and PEI (Mw 10,000) with and without addition of boric acid ($H_3BO_3$). SDW was mixed with 1.6 weight percent boric acid (based on the dry weight of SDW) for 3 hours at room temperature. PEI then was added in a weight ratio of 5:1 SDW to PEI as described above in Example 2. The resulting composition then was used directly to glue composites as described below in more detail. The adhesive bond strength date is shown in FIG. 7.

Each adhesive composition was used to prepare three specimens. The specimens were prepared from maple veneer strips measuring 1 cm by 17.5 cm by 0.6 mm (17.5 $cm^2$ bonding area). About 8-10 mg adhesive/$cm^2$ veneer strip of the adhesive composition was applied to one surface of a maple veneer strip. Two maple veneer strips were stacked together and hot-pressed at 277 psi and 120° C. for 5 minutes.

The glued veneer strips were cut into strips having a length of 2.54 cm and were tested for shear strength using an Instron TTBML testing machine with a crosshead speed of 1.0 mm/min. The maximum shear strength at breakage was recorded. The results of shear strength determinations for composites prepared using the various adhesive compositions are recorded in FIGS. 1-6.

As illustrated in FIG. 1, adhesive compositions prepared with adhesion promoter-treated lignin components comprising kraft lignin, solubilized decayed wood and decayed wood exhibit improved dry shear strength relative to adhesive compositions prepared with untreated lignin components. Solubilized decayed wood-based adhesives including an adhesion promoter exhibited the highest shear strength. The amount of carbohydrates in decayed wood is higher than the amount of carbohydrates in kraft lignin. The higher amount of carbohydrates may have contributed to the superior adhesive strength of the decayed wood adhesives due to the additional hydroxyl groups available for forming borate ester derivatives.

Figure 2:
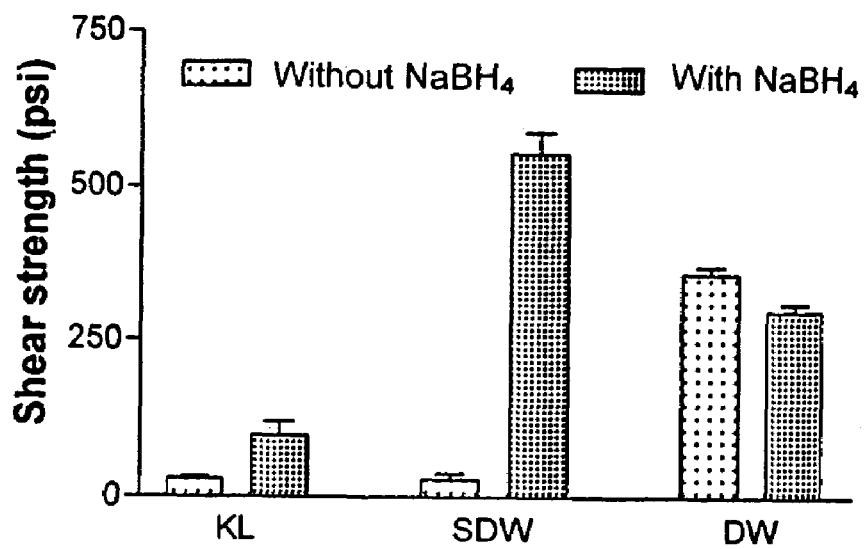
FIG. 2 is a bar graph illustrating the water resistance of wood composites made using adhesives prepared with and without sodium borohydride.

Composites prepared as described above also were subjected to two water resistance tests. According to the first water resistance test, the wood composites were soaked in water at room temperature for 24 hours, dried at room temperature in a fume hood for 24 hours, and then evaluated for maximum shear strength, as above. As illustrated in FIG. 2, after such a water-soaking-and-drying (WSAD) test, treatment of the lignin component of adhesive compositions with an adhesion promoter improves the water resistance of composites prepared using such compositions relative to adhesive compositions prepared with untreated lignin components. Adhesive compositions prepared with treated solubilized wood were the most resistant to water; however kraft lignin-based adhesives exhibited increased water resistance when an adhesion promoter was included in the composition.

Figure 3:
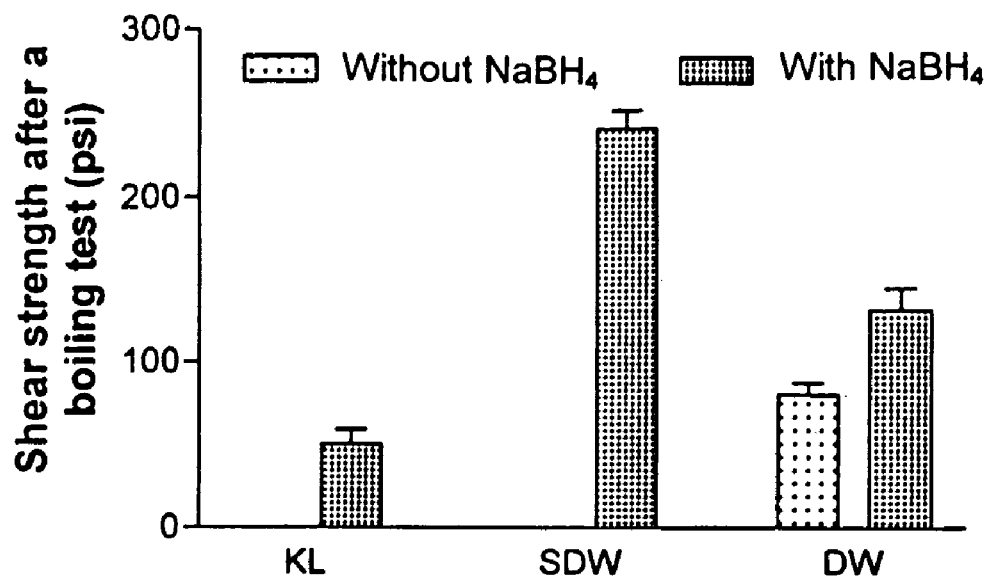
FIG. 3 is a bar graph illustrating the shear strength of wood composites made using adhesives prepared with and without sodium borohydride, and following treatment with boiling water.

The second water resistance test, a boiling test, was performed according to U.S. Voluntary Product Standard PS 1-95 for Construction and Industrial Plywood (published by the U.S. Department of Commerce through APA-The Engineered Wood Association, Tacoma, Wash.). According to this procedure, the composites were boiled in water for 4 hours and dried for 20 hours at 63±3° C. The composites were then boiled for another 4 hours, cooled to room temperature with tap water, and were evaluated for shear strength when the composites were wet. As illustrated in FIG. 3, treatment of the lignin component of an adhesive composition with an adhesion promoter improves the resistance of composites prepared with the adhesive to the boiling conditions. As illustrated in FIG. 3, the adhesive composition prepared with treated solubilized decayed wood was the most robust under the boiling conditions. However, adhesive compositions prepared with kraft lignin and decayed wood also exhibited improved water resistance when an adhesion promoter was included in the adhesive composition. Composite specimens bonded with kraft lignin and solubilized decayed wood without NaBH₄ delaminated (FIG. 3).

Figure 6:
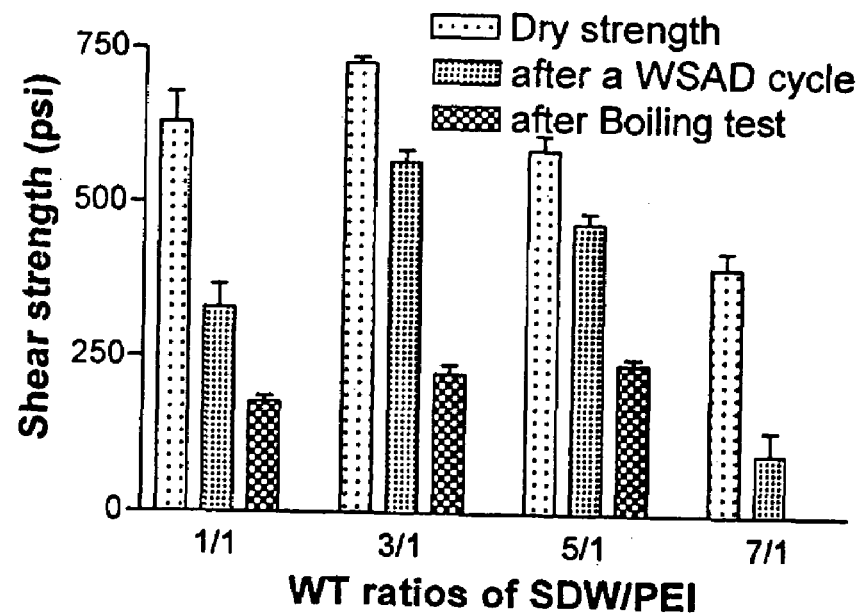
FIG. 6 is a bar graph illustrating the shear strength of wood composites prepared using adhesive compositions comprising different ratios of solubilized decayed wood to polyethyleneimine.

With reference to FIG. 6, compositions having a weight ratio of solubilized decayed wood to polyethyleneimine of about 3:1 gave the strongest adhesion, but a composition having a ratio of about 5:1 was easier to manipulate and exhibited comparable adhesion strength.

With reference to FIG. 7, composites bonded with SDW that is treated with boric acid exhibited improved dry strength bonding and water resistance bonding compared to composites bonded with SDW that had not been treated with boric acid.

EXAMPLE 5

This example describes preparing adhesive compositions from demethylated kraft lignin (DKL) (obtained from Gaylord Chemical Corporation, Bogalusa, La.) and PEI (Mw 150,000) at different DKL:PEI weight ratios. A mixture of DKL (10 g) and water (40 mL) was stirred and adjusted to pH=10 by adding 6 N NaOH solution. The resulting DKL solution was freeze-dried and the resulting DKL powder was used for preparation of DKL-PEI adhesives. DKL-PEI adhesives with a DKL:PEI weight ratio specified in FIG. 8 were prepared by stirring a mixture of the DKL powder, PEI and water for 10 min. The total solids content of DKL-PEI adhesives was 20%. The adhesive bond strength data are shown in FIG. 8

EXAMPLE 6

Figure 9:
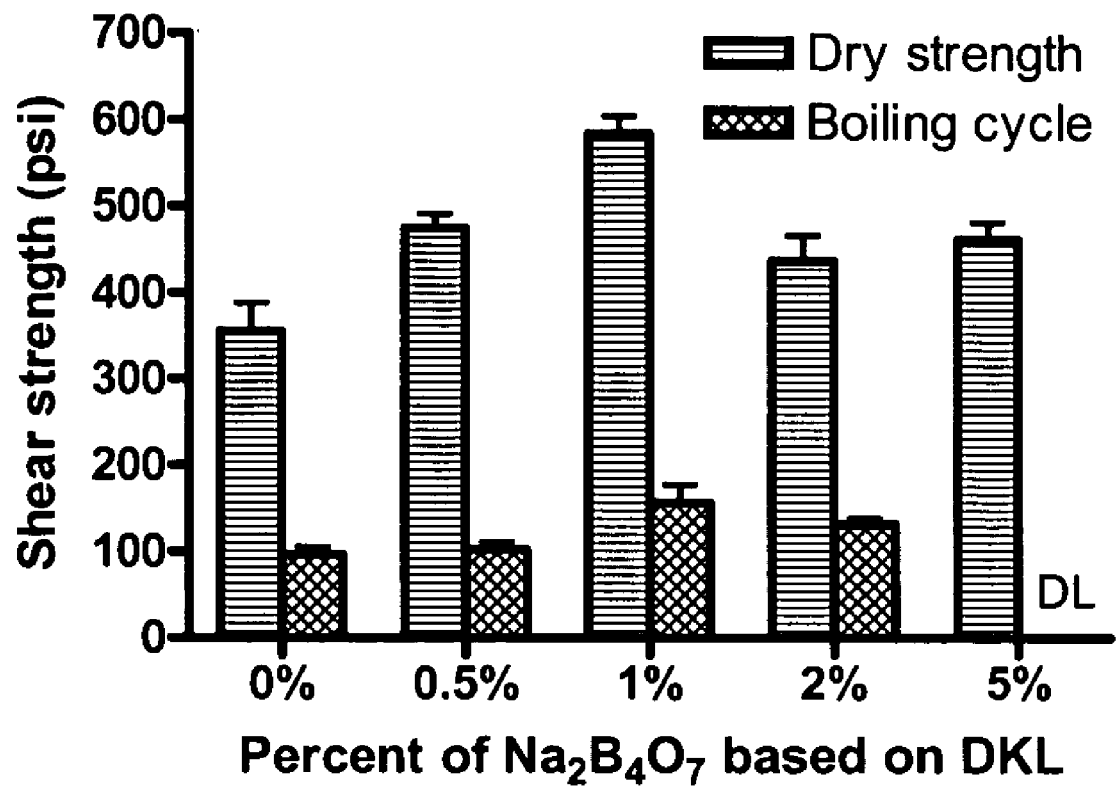
FIG. 9 is a bar graph illustrating the shear strength of wood composites prepared using adhesive compositions that include demethylated lignin, polyethyleneimine and sodium tetraborate.

This example describes preparing adhesive compositions from the alkaline DKL powder and PEI with and without addition of sodium tetraborate. The DKL:PEI weight ratio was 4:1. The percent of sodium tetraborate shown in FIG. 9 was based on dry weight of DKL. DKL-PEI-Na₂B₄O₇ adhesives were prepared by mixing the alkaline DKL powder, PEI, Na₂B₄O₇, and water for 10 min. The total solids content of the adhesives was 20%. The adhesive bond strength data are shown in FIG. 9.

Figure 8:
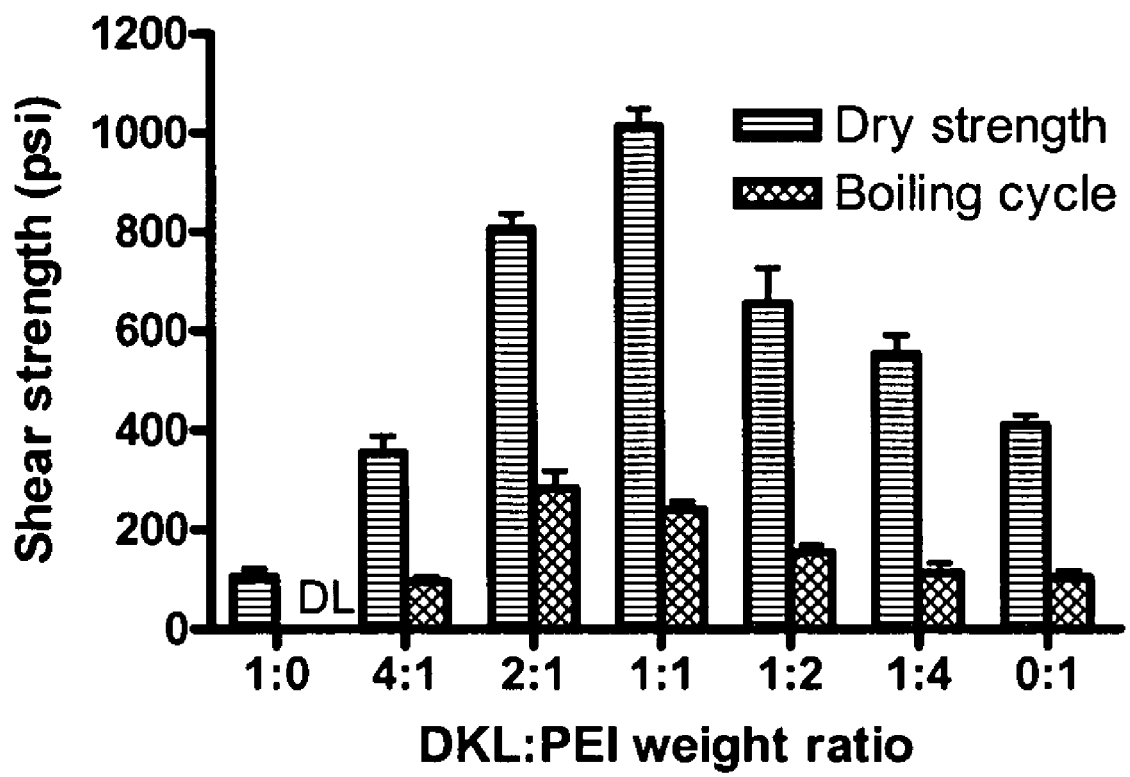
FIG. 8 is a bar graph illustrating the shear strength of wood composites prepared using adhesive compositions that include demethylated lignin and polyethyleneimine.

With reference to FIG. 8, compositions with a weight ratio of demethylated kraft lignin to polyethyleneimine of about 1:1 gave the strongest dry shear strength. With reference to FIG. 9, addition of about 1% sodium tetraborate to the DKL-PEI adhesives gave the highest shear strengths.

Having illustrated and described the principles of the disclosed methods, compositions and composites with reference to several embodiments, it should be apparent that these methods, compositions and composites may be modified in arrangement and detail without departing from such principles.

We claim:

1. An adhesive composition, comprising:
   at least one lignin component;
   at least one amine compound; and
   at least one boron compound,
   wherein the adhesive composition is substantially formaldehyde-free and is substantially free of any compounds that degenerate to form formaldehyde.

2. The composition according to claim 1 wherein the lignin component is derived from decayed lignocellulosic material.

3. The composition according to claim 1 wherein the lignin component comprises an industrial lignin preparation.

4. The composition according to claim 1 wherein the composition comprises from about 0.1% to about 5% of at least one boron compound or plural boron compounds by weight of the lignin component.

5. The composition according to claim 1 wherein the amine compound comprises a polyamine.

6. A substantially formaldehyde-free adhesive composition, comprising:
   solubilized decayed lignocellulosic material; and
   at least one polyamine,
   wherein the composition does not include a phenol-formaldehyde resin or a urea-formaldehyde resin.

7. The composition according to claim 6 wherein the solubilized decayed lignocellulosic material is mixed with a boron compound to produce boron-modified solubilized decayed wood.

8. The composition according to claim 7 wherein the boron-modified solubilized decayed lignocellulosic material comprises a reaction product of sodium borohydride and solubilized decayed lignocellulosic material.

9. The composition according to claim 6 wherein the composition further comprises a borate.

10. The composition according to claim 6 wherein the polyamine comprises polyethyleneimine.

11. The composition according to claim 6 wherein the solubilized decayed lignocellulosic material comprises a lignin.

12. A substantially formaldehyde-free adhesive composition comprising a batch of the following ingredients that includes:
    solubilized decayed lignocellulosic material;
    at least one boron compound; and
    at least one polyamine,
    wherein the composition is substantially free of any compounds that degenerate to form formaldehyde.

13. A substantially formaldehyde-free adhesive composition comprising a batch of the following ingredients that includes:
    solubilized decayed lignocellulosic material;
    at least one reducing agent; and
    at least one polyamine,
    wherein the composition is substantially free of any compounds that degenerate to form formaldehyde.

14. A substantially formaldehyde-free adhesive composition produced by:
    mixing decayed lignocellulosic material with at least one boron compound; and
    contacting the resulting mixture with at least one polyamine,
    wherein the composition is substantially free of any compounds that degenerate to form formaldehyde.

15. A substantially formaldehyde-free adhesive composition produced by:
    mixing decayed lignocellulosic material with at least one reducing agent; and
    contacting the resulting mixture with at least one polyamine,
    wherein the composition is substantially free of any compounds that degenerate to form formaldehyde.

16. The composition according to claim 2, wherein the decayed lignocellulosic material comprises decayed wood.

17. The composition according to claim 12, wherein the decayed lignocellulosic material comprises decayed wood.

18. A substantially formaldehyde-free adhesive composition comprising:
   a mixture of at least one decayed lignocellulosic material and an alkaline aqueous solution; and
   at least one polyamine,
   wherein the composition is substantially free of any compounds that degenerate to form formaldehyde.

19. The composition according to claim 1, wherein the boron compound is selected from boric acid, a boron salt, a borate ester, or a mixture thereof.

20. The composition according to claim 1, wherein the lignin component comprises demethylated lignin.

21. The composition according to claim 19, wherein the lignin component comprises demethylated lignin.

22. A substantially formaldehyde-free adhesive composition comprising a batch of the following ingredients that includes:
   demethylated lignin;
   at least one boron compound; and
   at least one polyamine,
   wherein the composition is substantially free of any compounds that degenerate to form formaldehyde.

23. The adhesive composition according to claim 22, wherein the boron compound is selected from boric acid, a boron salt, a borate ester, or a mixture thereof, and the polyamine comprises polyethyleneimine.

24. The composition according to claim 1 wherein the composition does not include a phenol-formaldehyde resin or a urea-formaldehyde resin.

25. The composition according to claim 14 wherein the composition does not include a phenol-formaldehyde resin or a urea-formaldehyde resin.

26. The composition according to claim 22 wherein the composition does not include a phenol-formaldehyde resin or a urea-formaldehyde resin.

27. The composition according to claim 1, wherein the lignin component comprises phenolic polymers.

28. The composition according to claim 1, wherein the adhesive composition is a binder for making a lignocellulosic composite.

29. The composition according to claim 15, wherein the adhesive composition is a binder for making a lignocellulosic composite.

* * * * *